United States Patent
Mohr

(10) Patent No.: US 6,672,684 B2
(45) Date of Patent: Jan. 6, 2004

(54) VEHICLE BRAKE SYSTEM WITH A MOTOR/PUMP UNIT

(75) Inventor: Kurt Mohr, Halsenbach (DE)

(73) Assignee: Lucas Varity GmbH (DE)

(*) Notice: Subject to any disclaimer, the term of this patent is extended or adjusted under 35 U.S.C. 154(b) by 0 days.

(21) Appl. No.: 10/165,197

(22) Filed: Jun. 7, 2002

(65) Prior Publication Data
US 2002/0195871 A1 Dec. 26, 2002

Related U.S. Application Data

(63) Continuation of application No. PCT/EP00/12350, filed on Dec. 7, 2000.

(30) Foreign Application Priority Data
Dec. 7, 1999 (DE) .......................... 199 58 936

(51) Int. Cl.⁷ ............................................ B60T 13/16
(52) U.S. Cl. ........................ 303/10; 303/11; 303/115.4
(58) Field of Search .................... 303/10, 11, 115.4, 303/115.5; 417/271, 357

(56) References Cited

U.S. PATENT DOCUMENTS

| | | | |
|---|---|---|---|
| 4,435,021 A | 3/1984 | Hoenick | |
| 4,850,812 A | * 7/1989 | Voight | 417/271 |
| 5,220,225 A | * 6/1993 | Moon | 310/87 |
| 6,024,541 A | * 2/2000 | Perstnev et al. | 417/269 |
| 6,035,828 A | * 3/2000 | Anderson et al. | 123/446 |

FOREIGN PATENT DOCUMENTS

| | | |
|---|---|---|
| DE | 2260506 | 6/1974 |
| DE | 7245277 | 9/1979 |

* cited by examiner

Primary Examiner—Christopher P. Schwartz
(74) Attorney, Agent, or Firm—MacMillan, Sobanski & Todd, LLC

(57) ABSTRACT

The motor/pump unit (10) comprises an electromotor (12) and at least one pump (14) for delivering brake fluid. The electromotor (12) has a motor stator (16) in which a motor rotor (18) is rotatably disposed. The pump (14) is disposed substantially within the motor rotor (18) and can be driven by the latter. In order to provide a vehicle brake system with a motor/pump unit (10) which is capable of delivering brake fluid in a highly dynamic fashion, the motor stator (16) and at least one section (22) of the motor rotor (18) which is directed towards the motor stator (16) define an electromagnetic region (16, 22, 24), and at least the pump (14) defines a hydraulic region (14, 26), wherein at least one sealing element (28, 96, 98) is provided which separates the electromagnetic region (16, 22, 24) from the hydraulic region (14, 26) in a fluid-tight fashion.

10 Claims, 2 Drawing Sheets

VEHICLE BRAKE SYSTEM WITH A MOTOR/PUMP UNIT

CROSS REFERENCE TO RELATED APPLICATIONS

This application is a continuation of International Application No. PCT/EP00/12350 filed Dec. 7, 2000, which claims priority to German Patent Application No. 19958936.4 filed Dec. 7, 1999, the disclosures of which are incorporated herein by reference.

BACKGROUND OF THE INVENTION

The invention relates to a vehicle brake system which comprises a motor/pump unit with an electromotor and at least one pump for delivering brake fluid. The electromotor comprises a motor stator in which a motor rotor is rotatably disposed. The pump is disposed substantially within the motor rotor and can be driven by the latter. The invention also relates to a motor/pump unit of this kind.

The motor/pump unit serves to deliver brake fluid to and from wheel brakes of the vehicle brake system in order to actuate or release these brakes. Vehicle brake systems of this kind are also called electrohydraulic brake systems, which can be operated in so-called anti-lock braking, traction or vehicle movement dynamics control mode. The motor/pump unit may be disposed directly at a wheel brake of a vehicle or serve as a central supply member for a plurality of wheel brakes.

A brake system with a vehicle brake actuator in which an electromotor comprises a stator winding fitted in a stationary fashion and a rotor fitted so as to be rotatable therein is known from U.S. Pat. No. 4,435,021 A, which is hereby incorporated by reference. The rotor bears a plurality of axial pistons which are supported at an inclined end face, with which they form an inclined-plate pump. Brake fluid which flows around the rotor emerges at the axial pistons during operation of the inclined-plate pump. The brake fluid also enters a gap between the stator winding and the rotor, where it gives rise to a high fluid friction resistance and reduces the magnetic flux between the stator winding and the rotor. The electromotor therefore has a low dynamic performance level, i.e. poor starting and response characteristics.

The object of the invention is to remedy the above-mentioned problem and in particular to provide a vehicle brake system with a motor/pump unit which is capable of delivering brake fluid in a highly dynamic fashion.

SUMMARY OF THE INVENTION

The object is achieved according to the invention by a vehicle brake system with a motor/pump unit which has the above-mentioned features and is developed such that the motor stator and at least one section of the motor rotor which is directed towards the motor stator define an electromagnetic region, at least the pump defines a hydraulic region, and at least one sealing element is provided which separates the electromagnetic region from the hydraulic region in a fluid-tight fashion.

The sealing element which is disposed according to the invention separates the motor stator and the section of the motor rotor which faces it from the hydraulic region of the pump, in which brake fluid is located. It is therefore impossible for any brake fluid to enter the gap between the motor stator and the motor rotor. This means that no fluid friction resistance occurs in the gap and the dynamic performance of the electromotor is significantly augmented. This measure at the same time increases the efficiency of the electromotor. The result is a an electromotor and pump combination which is optimised in control terms. Moreover, the electromagnetic region is separated from the hydraulic region in a fluid-tight fashion, so that no dirt can reach the electromagnetic region. There is thus no possibility of the motor stator being soiled or damaged, for example due to aggressive brake fluid. The electromotor and the pump are in this case of a particularly compact configuration in a so-called cartridge construction. It is also possible for a plurality of pumps to be surrounded by the motor rotor, in particular radially, in order, for example, to provide an individual pressure source for each wheel brake.

The object is also achieved according to the invention by a motor/pump unit of this kind.

The vehicle brake system is advantageously developed such that there is just an air gap between the motor stator and the motor rotor. The entire motor rotor is located in the hydraulic region in the case of the vehicle brake actuator which is described in U.S. Pat. No. 4,435,021 A. The motor winding is therefore surrounded internally by a partition which separates it off from the hydraulic region and also from the motor rotor. However this partition may be dispensed with in order to achieve the object according to the invention. The spacing between the motor stator and the motor rotor may therefore be very small. This additionally improves the efficiency and response and starting characteristics of the electromotor.

According to an advantageous development, the motor stator is fitted in a stationary fashion in a casing, and the sealing element is formed in an annular fashion between the motor rotor and the casing. In this particularly simple configuration of the invention the sealing element which is used may be a conventional, inexpensive sealing ring which is selected from a wide range and can therefore be adapted particularly well to the sealing object which is to be achieved.

In an advantageously developed vehicle brake system the motor rotor is rotatably supported in the casing about a rotational axis by means of two bearings which are disposed at the axial end regions of the motor rotor. The bearings enable the motor rotor to be precisely guided, with the possibility of adjusting its position independently of the pump.

The motor rotor is advantageously substantially cup-shaped and comprises at its bottom a coaxially fitted drive shaft, which is connected in a driving fashion, for driving the pump. Because the cup shape is only open to one side, a configuration of this kind enables a closed space for the pump to be sealed off particularly easily in the motor rotor. For example, a sealing element may be disposed at the opening of the cup-shaped motor rotor for this purpose.

However the casing advantageously comprises a substantially hollow cylindrical casing section which projects radially inwards and coaxially into the cup-shaped motor rotor, and the sealing element is advantageously disposed between the hollow cylindrical casing section and the drive shaft. The motor rotor is thereby sealed off at a relatively small area, and a sealing element of a small diameter can be used. Sealing elements of this kind have a relatively low frictional resistance and require little construction space. Moreover, because the casing section is disposed between the motor rotor and the pump, there is no fluid friction between the motor rotor and the pump.

In an advantageous configuration the motor rotor is substantially of a hollow cylindrical shape and connected in a driving fashion to the pump at an inner circumferential surface. This constitutes a particularly simple coupling between the pump and the motor rotor which may, for example, be in the form of a tongue-and-groove joint. The motor rotor and the pump may in this respect be elastically connected such that little structure-borne sound is transmitted outwards from the pump to the motor rotor and the casing.

A respective sealing element is advantageously disposed between the axial end sections of the motor rotor and the casing in this configuration. This means that a particularly large construction space is available for the pump. The pump may also pass axially through the motor rotor.

The pump is advantageously formed as an inclined-plate pump, in which a pump rotor is coupled in a driving fashion to the motor rotor, in which pump rotor at least one axial piston can be displaced, the latter being supported at an inclined plate fitted in a stationary fashion to the casing. This configuration is used together with a hollow cylindrical motor rotor, to which the pump rotor is directly coupled. The pump rotor may then also be integral with the motor rotor.

The pump may alternatively be in the form of a swash-plate pump, with a swash plate being coupled in a driving fashion to the motor rotor and supporting at least one axial piston which can be axially displaced in a piston guide which is fitted in a stationary fashion to the casing. This configuration can be used to particular advantage together with a cup-shaped motor rotor, to the bottom of which the swash plate is coupled.

BRIEF DESCRIPTION OF THE DRAWINGS

Further features and properties are illustrated on the basis of the description of two embodiments with reference to the accompanying drawings.

DETAILED DESCRIPTION OF THE INVENTION

Figure 1:
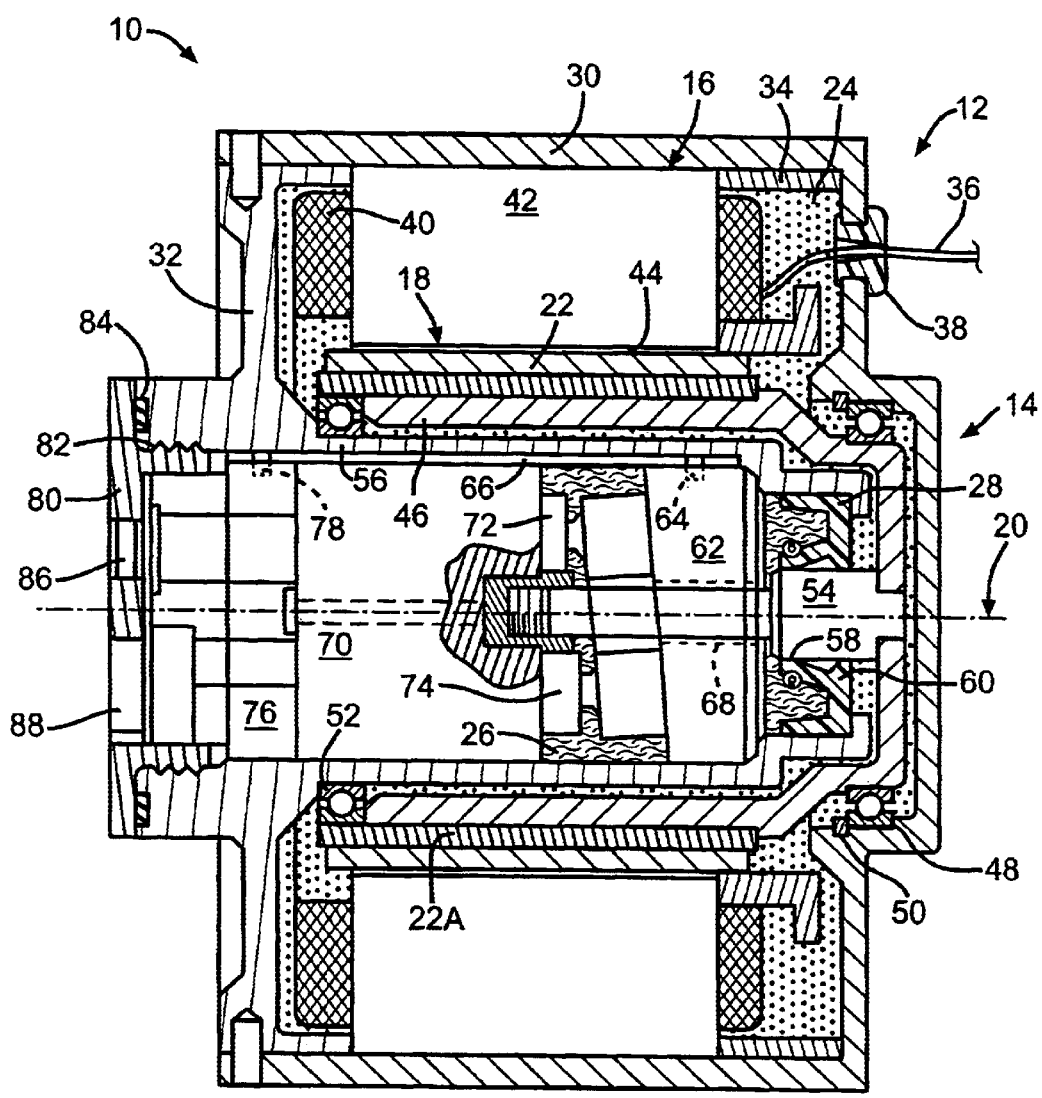
FIG. 1 is a longitudinal sectional view of a first embodiment of a motor/pump unit according to the invention.

A motor/pump unit 10 is represented in FIG. 1, this unit comprising an electromotor 12, which in the represented embodiment is a brushless d.c. motor, and a pump 14.

The electromotor 12 is formed with a hollow cylindrical motor stator 16 and a motor rotor 18, which is disposed in the latter. The motor rotor 18 can rotate about a rotational axis 20, and its section which radially faces the motor stator 16 comprises permanent magnets 22. The motor rotor 18 is substantially of a hollow cylindrical shape. The pump 14 is disposed coaxially with the rotational axis 20 in its cavity. The pump 14 is driven by means of the motor rotor 18 during operation of the motor/pump unit 10 in order to deliver brake fluid to wheel brakes, which are not represented, or away from these.

In order to obtain a highly dynamic motor/pump unit 10, the motor stator 16 and the radially outer part of the motor rotor 18, i.e. the permanent magnets 22, are surrounded by a gas space 24 (marked by dots) containing air. This part of the motor/pump unit 10 is called the electromagnetic region. The pump 14 is also surrounded by a fluid space 26 (marked by wavy lines) which is filled with brake fluid, this part being called the hydraulic region of the motor/pump unit 10. An annular sealing element 28 is disposed between the electromagnetic and the hydraulic region, which element separates these regions in a fluid-tight fashion. As the electromagnetic region is therefore without brake fluid, no fluid friction is produced between the motor stator 16 and the motor rotor 18. The dynamic performance of the motor/pump unit 10 is as a result improved. There is also no possibility of the motor stator 16 and the motor rotor 18 being soiled or damaged by brake fluid.

The embodiment which is represented in FIG. 1 is described in detail in the following. The motor/pump unit 10 is externally bounded by a cup-shaped casing part 30, which is rotationally symmetrical about the rotational axis 20 and is closed by a casing cover 32 at an end side which is on the left in FIG. 1. A spacer ring 34 and then the motor stator 16 are inserted axially in the casing part 30. The motor stator 16 is held axially between the spacer ring 34 and the casing cover 32 and is supported radially at the casing part 30.

At the end wall which is opposite the casing cover 32 the cup-shaped casing part 30 comprises an opening through which a feed line 36 is passed into the interior of the casing part 30. Here the lead-through of the feed line 36 is sealed off by means of an elastomer sleeve 38.

The motor stator 16 comprises a stator winding 40, which is positioned around an iron core 42. There is just a small air gap 44 between the iron core 42 and the permanent magnets 22.

The motor rotor 18 comprises a cup-shaped rotor body 46 which bears a backing portion 22A of the permanent magnets 22 on the outside in the radial direction as shown in FIG. 1. The cup-shaped rotor body 46 is mounted at its end section which is on the right in FIG. 1 by means of a ball bearing 48, which is held in the cup-shaped casing part 30 by a spring ring 50. The end section of the cup-shaped rotor body 46 which is axially opposite the ball bearing 48 is supported by means of a second ball bearing 52 in the casing cover 32. The rotor body 46 is positioned precisely in relation to the motor stator 16 by the bearings 48 and 52. The air gap 44 may therefore be particularly small. A drive shaft 54 projects coaxially into the cavity formed by the rotor body 46 at a bottom of the cup-shaped rotor body 46. A hollow cylindrical casing section 56 of the casing cover 32 projects into the cavity from the side which is opposite the bottom of the cup-shaped rotor body 46. This casing section 56 is stepped at the end region which faces the drive shaft 54 and bears here the annular sealing element 28, which provides a seal with respect to the drive shaft 54. The sealing element 28 is pressed into the casing section 56 and comprises two sealing lips 58 and 60, which lie against the drive shaft 54. The sealing element 28 is U-shaped, with the opening of the U shape being directed towards the hydraulic region. The sealing lip 58 is therefore pressed against the drive shaft 54 by hydraulic pressure.

An inclined plate 62 is disposed axially next to the sealing element 28 in the casing section 56 and is fixed by means of a feather key 64 engaging in a longitudinal groove 66 which is formed in the hollow cylindrical casing section 56. A coaxial bore 68 is formed in the inclined plate 62, in which bore the drive shaft 54 passes through the inclined plate 62. The drive shaft 54 projects into a cylindrical pump rotor 70, which is disposed axially next to the inclined plate 62 in the casing section 56, in which it is rotatably mounted. The cylindrical outer surface of the pump rotor 70 also co-operates with a part of the cylindrical inner surface of the casing section 56 as a sliding-contact bearing.

Axial pistons can be displaced in the pump rotor 70, two of which pistons are designated by reference numbers 72 and 74 in FIG. 1. The axial pistons 72 and 74 are supported at the inclined plate 62, so that an axial piston pump in the form of an inclined-plate machine is created. At the end side of the pump rotor 70 which is opposite the inclined plate 62 this rotor 70 is supported at a plate-shaped pump shield 76, which is positioned by means of a feather key 78 in the longitudinal groove 66 so as to be non-rotatable with respect to the casing section 56.

The pump shield 76 is adjoined on the outside in the axial direction by a pump cover 80, which comprises a shoulder which is directed towards the casing section 56 and has a radial external tooth system 82. The external tooth system 82 meshes with a corresponding internal tooth system formed at the casing cover 32. A sealing ring 84 is inserted in the casing cover 32 at the end side which faces the pump cover 80. The pump cover 80 is therefore disposed such that it cannot rotate and closes the casing cover 32 in a fluid-tight fashion.

Two connections 86 and 88 are formed in the pump cover 80 in order to connect the pump shield 76 and the pump rotor 70 to brake fluid lines, which are not represented.

The motor rotor 18 rotates relative to the motor stator 16 when the motor/pump unit 10 is operating and in the process rotates the drive shaft 54. The drive shaft 54 rotates the pump rotor 70, and the axial pistons 72 and 74 move and deliver brake fluid. As the pump 14 has no valve control system, the direction in which the pump 14 delivers can be changed by reversing the direction of rotation of the drive shaft.

Figure 2:
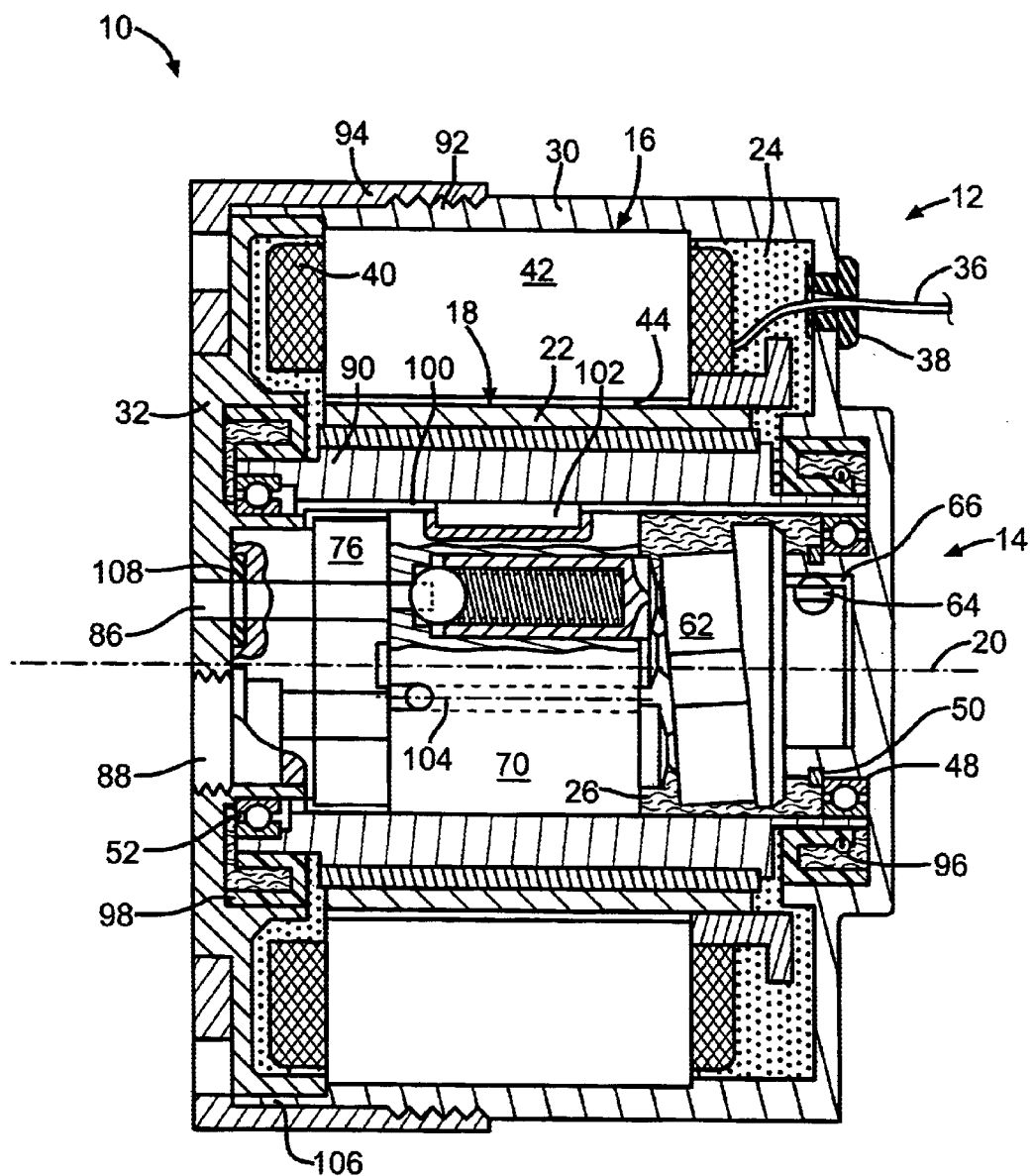
FIG. 2 is a longitudinal sectional view of a second embodiment of a motor/pump unit according to the invention.

The embodiment which is represented in FIG. 2 resembles in functional terms that which is represented in FIG. 1. The motor stator 16 is fitted in the casing part 30, in which stator the motor rotor 18 is rotatably mounted on the inside in the radial direction. The motor rotor 18 comprises a hollow cylindrical rotor body 90, which is mounted at its axial end regions with the ball bearing 48 in the casing part 30 and with the ball bearing 52 in the casing cover 32. The ball bearing 48 is likewise fixed by means of the spring ring 50 and forms a rigid bearing, whereas the ball bearing 52 forms a movable bearing. An external thread 92, onto which a lock ring 94 is screwed, is formed at the cup-shaped casing part 30. The casing cover 32 is coupled to the casing part 30 by means of the lock ring 94 in order to position the ball bearings 48 and 52 relative to one another and the motor rotor 18 in the motor stator 16.

An annular sealing element 96 and 98, respectively, is disposed on the outside in the radial direction about the ball bearings 48 and 52, respectively, in the cup-shaped casing part 30 and in the casing cover 32, which element provides a seal between the hollow cylindrical rotor body 90 and the casing part 30 or the casing cover 32. The electromagnetic region is thus separated from the hydraulic region as described above.

In this embodiment the inclined plate 62 is fitted directly to the casing part 30 and secured so as not to rotate by means of the feather key 64 in the groove 66 in the casing part 30. The pump rotor 70 is disposed axially next to the plate 62 and comprises three axial pistons. A longitudinal groove 100 is formed in the inner surface of the hollow cylindrical rotor body 90. A feather key 102, which is mounted so as to be stationary at the outer surface of the pump rotor 70, engages in the longitudinal groove 100. The pump rotor 70 is coupled via the feather key 102 to the motor rotor 18 so as to rotate with it. An axial through-bore 104 is also formed in the pump rotor 70, via which bore the connection 88 communicates with the fluid space 26.

A recess is formed in the casing cover 32 in a region of the circumference, in which recess a lug 106 of the casing part 30 engages. The casing cover 32 is therefore positioned so as not to rotate. A sealing ring 108, which provides a seal with respect to the casing cover 32, is also inserted in the pump shield 76.

The motor rotor 18 drives the pump rotor 70 via the feather key 102 when the motor/pump unit 10 which is represented in FIG. 2 is operating. The motor rotor 18 is in this case only separated from the motor stator 16 by the air gap 44, so that a high magnetic flux is guaranteed and the frictional resistance between the parts rotating relative to one another is negligible. The pump rotor 70 rotates with the motor rotor 18, so that there is also no friction between these components—for example due to fluid friction of brake fluid. The motor/pump unit 10 therefore has a particularly high dynamic performance level and very good starting and response characteristics.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A motor/pump unit for delivering brake fluid in a vehicle brake system, comprising:
    an electromotor including a motor stator in which a motor rotor is rotatably disposed;
    a pump disposed substantially within said motor rotor and driven by said motor rotor;
    said motor stator and at least one portion of said motor rotor which is directed towards said motor stator defining an electromagnetic region;
    at least said pump defining a hydraulic region; and
    at least one sealing element separating the electromagnetic region from the hydraulic region in a fluid-tight fashion, wherein there is just an air gap between said motor stator and said motor rotor.

2. A motor/pump unit according to claim 1 wherein said motor stator is fitted in a stationary fashion in a casing, and said sealing element is formed in an annular fashion between said motor rotor and said casing.

3. A motor/pump unit according to claim 2 wherein said motor rotor is rotatably supported in said casing about a rotational axis by means of two bearings which are disposed at axial end portions of said motor rotor.

4. A motor/pump unit according to claim 3 wherein said motor rotor is substantially cup-shaped and comprises at a bottom a coaxially fitted drive shaft, which is connected in a driving fashion, for driving said pump.

5. A motor/pump unit according to claim 4 wherein said casing comprises a substantially hollow cylindrical casing portion which projects radially inwards and coaxially into said cup-shaped motor rotor, and said sealing element is disposed between said hollow cylindrical casing section and said drive shaft.

6. A motor/pump unit according to claim 3 wherein said motor rotor is substantially of a hollow cylindrical shape and connected in a driving fashion to said pump at an inner circumferential surface.

7. A motor/pump unit according to claim 6 wherein said sealing element is a first sealing element and including a respective second sealing element disposed between said axial end portions of said motor rotor and said casing.

8. A motor/pump unit according to claim 1 wherein said pump is formed as an inclined-plate pump, and wherein a pump rotor is coupled in a driving fashion to said motor rotor, in which pump rotor at least one axial piston can be displaced, said axial piston being supported at an inclined plate fitted in a stationary fashion to said casing.

9. A motor/pump unit according to claim 1 wherein said pump is a swash-plate pump, and wherein a swash plate is coupled in a driving fashion to said motor rotor and supports at least one axial piston, which can be axially displaced in a piston guide which is fitted in a stationary fashion to said casing.

10. An electrohydraulic vehicle brake system including a motor/pump unit having the features as described in claim 1.

* * * * *